(12) United States Patent
Morgenstein (10) Patent No.: US 7,745,962 B2
(45) Date of Patent: Jun. 29, 2010

(54) THERMAL TO ELECTRICAL ENERGY CONVERTER

(75) Inventor: Haim Morgenstein, Beit-Arie (IL)

(73) Assignee: Green Gold 2007 Ltd., Beit-Arie (IL)

( * ) Notice: Subject to any disclaimer, the term of this patent is extended or adjusted under 35 U.S.C. 154(b) by 1003 days.

(21) Appl. No.: 10/587,557

(22) PCT Filed: Feb. 14, 2005

(86) PCT No.: PCT/IL2005/000186

§ 371 (c)(1),
(2), (4) Date: Jul. 31, 2006

(87) PCT Pub. No.: WO2005/081626

PCT Pub. Date: Sep. 9, 2005

(65) Prior Publication Data

US 2007/0157615 A1    Jul. 12, 2007

(30) Foreign Application Priority Data

Feb. 26, 2004    (IL)    ................................ 160623

(51) Int. Cl.
*H02K 44/00* (2006.01)
(52) U.S. Cl. ..................... 310/11; 310/306; 335/47; 335/51; 165/104.32
(58) Field of Classification Search ............ 310/11, 310/306; 335/47, 51; 165/104.32
See application file for complete search history.

(56) References Cited

U.S. PATENT DOCUMENTS

| 2,510,800 | A | 6/1950 | Chilowsky |
| 3,375,664 | A | 4/1968 | Wells, Jr. |
| 3,859,789 | A | 1/1975 | Fawcett et al. |
| 3,938,337 | A | 2/1976 | Fawcett et al. |
| 4,064,409 | A * | 12/1977 | Redman ............... 310/306 |
| 4,557,112 | A | 12/1985 | Smith |
| 6,651,433 | B1 * | 11/2003 | George, Jr. ............ 60/618 |
| 6,943,461 | B2 | 9/2005 | Kaploun |
| 2003/0208959 | A1 * | 11/2003 | Weimer et al. ......... 48/198.1 |
| 2004/0182099 | A1 * | 9/2004 | Hsu .................. 62/259.2 |

OTHER PUBLICATIONS http://mrsec.wisc.edu/Edetc/background/ferrofluid/index.html—(5 pages)(formerly http://mrsec.wisc.edu/edetc/ferrofluid).

(Continued)

*Primary Examiner*—Jennifer K Michener
*Assistant Examiner*—Jayne Mershon
(74) *Attorney, Agent, or Firm*—Roach Brown McCarthy & Gruber, P.C.; Kevin D. McCarthy (57) ABSTRACT

The invention is a converter for converting thermal energy into electrical energy. The energy conversion takes place by causing magnetic particles that are initially suspended in ferrofluid to circulate in the converter and to induce electric currents when they pass through one or more coils of electric wires that are coiled around parts of the conduits of the converter. The particles are caused to circulate around the main circuit of the converter by controlling the local temperature and pressure at different locations in the main circuit. The invention also is a method of using the converter to produce electricity.

21 Claims, 6 Drawing Sheets

OTHER PUBLICATIONS http://www.ferrotec.com/usa/technology/—(3 pages)(formerly http://www.ferrotec.com/USA/ferrofluid_technology_overview.htm).

http://www.ferrotec.com/products/ferrofluid/domainDetection.php—(2 pages)(formerly http://www.ferrotec.com/USA/domain_detection.htm).

http://www.rare-earth-magnets.com/SearchResult.aspx?KeyWords=Ferrofluid&All=True—(2 pages)(formerly http://www.rare-earth-magnets.com/detail.aspx?ID=6).

http://www.physicscentral.com/action/2003/ferrofluids.html—(3 pages)(formerly http://www.physicscentral.com/action/action-03-07-print.html).

International Preliminary Report on Patentability for corresponding PCT application—5 pages.

Written Opinion of the International Searching Authority for the Corresponding PCT application—4 pages.

International Search Report for the Corresponding PCT application—3 pages.

* cited by examiner

THERMAL TO ELECTRICAL ENERGY CONVERTER

FIELD OF THE INVENTION

The present invention relates to the field of energy production. More particularly, the present invention relates to an energy converter unit (hereinafter sometimes simply 'converter') for converting thermal energy into electrical energy.

BACKGROUND OF THE INVENTION

Currently, the most commonly used electrical energy production technologies still make massive use of fossil fuels, which are used for generating steam. The generated steam imparts rotation of movement to a turbine, the shaft of which is mechanically coupled to a rotor of an electrical generator. Upon rotation of the rotor, electrical energy is produced, the magnitude of which is a function, among other things, of the rotation of speed of the rotor and the size of the generator. Using coal, petroleum or gas for producing electricity has several drawbacks. For example, transportation of coal and fuel is expensive and raises the final cost of the electrical energy that is produced using them. In addition, using coal and fossil fuel greatly pollutes the environment. These, and other, drawbacks encourage the development and use of other alternative technologies, and in particular technologies that are based on the exploitation of energy of wind, sea waves and solar energy.

Currently, there are technologies that exploit solar energy in two ways. The first way involves exploiting solar energy to directly heat a liquid, usually water, for, e.g., heating the interior of an apartment. According to this method, a conduit, through which the liquid (normally water) passes, is laid in a 'heat absorbing environment' where it is exposed to the solar energy. The 'heat absorbing environment' is normally a flat black metal platform, on which the conduit is coiled to absorb as much of the solar energy as possible. Since solar systems of this kind are in broad use, no further description of will be given herein with respect to their functioning and structure. The conversion efficiency of this technology is known to be very low (usually not more than 10%).

The second way to exploit solar energy is to convert it into electricity. Direct Thermal to Electric Conversion (DTEC) technologies are known. Recent advances in thermal-to-electric conversion technologies such as thermoelectrics and thermophotovoltaics have demonstrated the potential for achieving high-efficiency, solid-state electric generators that could convert thermal energy into electricity. However, these technologies are very expensive, and they produce direct current, which is problematic because many electricity appliances use alternating current.

The efficiency, by which heat can be converted into electricity, is limited by the theoretical maximum efficiency of the Carnot cycle, which is known to be a cycle (of expansion and compression) of an idealized reversible heat engine that does work without loss of heat. Although the Carnot efficiencies drop as the temperature differences between hot and cold side decreases, the theoretical maximum conversion efficiencies can range from a low of about 40% to a high of about 77%, depending on the used thermal sources. However, current Direct Thermal to Electric Conversion (DTEC) technologies fall far short of Carnot conversion efficiencies and, in many cases, fail to exhibit sufficient power densities to meet requirements for many commercial applications.

It is a known phenomenon that a movement of an electrically conducting wire across a magnetic field induces an electric current in the wire, which depends, among other things, on the flux of the magnetic field and on the velocity of the wire. Likewise, a flow of a 'liquified' magnet inside a conduit, around which a conducting wire is coiled, can induce electric current in the wire.

In recent years, researchers have prepared ferrofluids, which have the fluid properties of a liquid and the magnetic properties of a solid. The ferrofluids contain tiny particles of a magnetic solid suspended in a liquid medium. A ferrofluid is a stable colloidal suspension of sub-domain magnetic particles in a liquid carrier. The particles, which have an average size of about 100 Å (10 nm), are coated with a stabilizing dispersing agent (surfactant) which prevents particle agglomeration even when a strong magnetic field gradient is applied to the ferrofluid. A typical ferrofluid may contain (by volume) 5% magnetic solid, 10% surfactant and 85% carrier (liquid). Ferrofluids are commercially available.

A notion, as to the properties and actual and possible uses of ferrofluids may be found in the following websites:
http://mrsec.wisc.edu/edetc/ferrofluid;
http://www.physicscentral.com/action/action-03-07-print.html;
http://www.ferrotec.com/usa/ferrofluid_technology_overview.htm;
http://www.ferrotec.com/usa/domain_detection.htm; and
http://www.rare-earth-magnets.com/detail.aspx?ID=6.

When a ferrofluid surrounded by a gaseous environment is placed in a container and its temperature is its boiling temperature, the liquid portion thereof evaporates. If this process takes place in a situation where the gas is flowing, then the magnetic particles are swept along into the gas stream. Hereinafter, by 'ferrogas' is meant hereinafter a mixture of two gases, one being the vapors of the ferrofluid and the other being the carrier gas (e.g., air or $CO_2$), which carries the magnetic particles. By 'carrier gas' is meant herein the gaseous atmosphere initially surrounding the ferrofluid.

By 'ferromixture' is meant hereafter a combination of ferrofluid and ferrogas. Depending on the location of the magnetic particles in the converter, they may be suspended in a ferrofluid, ferrogas or ferromixture.

It is an object of the invention to provide an apparatus which utilizes the magnetic characteristics of ferrofluid to produce electric energy.

It is another object of the invention to provide an apparatus for converting thermal energy into electricity with a higher efficiency then the conversion efficiency in conventional technologies.

Other objects and advantages of the invention will become apparent as the description proceeds

SUMMARY OF THE INVENTION

The present invention provides a ferrofluid based closed-loop energy converter (hereinafter just 'converter') for converting thermal energy into electrical energy.

By 'first temperature ($T1$) is meant hereinafter the instantaneous temperature of a Heat Absorbing Container (HAC), and by 'second temperature ($T2$) is meant hereinafter the instantaneous temperature of a Heat Dissipating Container (HDC), which is, sometimes, referred to as 'condenser'.

By 'outlet conduit' is meant a conduit that conveys ferrogas from the outlet of the HAC to the inlet of the HDC. Under some operating conditions, and depending on the location of the ferromixture in the closed-loop converter, it might occur, that the liquid of the ferromixture turns completely into gas and the ferromagnetic particles, which are normally suspended in a liquid carrier, are no longer suspended in the liquid carrier, but, rather, they are suspended in a gas carrier. Changing the phase of the liquid of the ferrofluid to gas, and vice versa, is essential for providing the force that drives the magnetic particles in cyclic manner in the closed-loop converter.

The content of the gas in the ferromixture varies according to the temperature of the mixture and the pressure exerted thereon. An adequate quantity of gas in the ferromixture makes it compressible, to some extent, which property is utilized by this invention, as described hereinafter.

By 'inlet conduit' is meant a conduit that conveys ferrofluid from the outlet of the HDC (i.e. the condenser) to the inlet of the HAC.

By 'activated valve' is meant hereinafter a valve that is activated by use of an actuator that can be, e.g., an electromechanical, a mechanical or magnetic. The actuator can be operated by a mechanical controller (i.e., a mechanical synchronizer) or by an electronic controller (hereinafter referred to collectively as 'control means'), to control the activation of the valve. In case of an electronic controller, it is provided with dedicated software.

The converter of this invention is a closed system that contains, at the time of its assembling, a ferrofluid and a carrier gas (in a ratio of ferrofluid to carrier gas of about 1:4). The mixture ferrofluid and carrier gas is kept at sub-atmospheric pressure, to lower and control the boiling temperature of the ferrofluid.

In a first aspect the invention is a converter for converting thermal energy into electrical energy by causing magnetic particles to circulate in the converter to induce electric current in one or more coils of electric wires. The converter of the invention comprises:

a) A main circuit, comprising:
   a.1) A Heat Absorbing Container (HAC), having an inlet, connected to the first end of an inlet conduit, and a first outlet, connected to a first end of an outlet conduit. The inlet conduit, the outlet conduit, and the HAC initially contain ferrofluid and carrier gas. The HAC is designed to absorb heat energy from an external heat source in order to heat the ferrofluid and the carrier gas to a first temperature (T1), at a first pressure (P1).
   a.2) An elongate Heat Dissipating Container (HDC) initially filled with ferrofluid and carrier gas. The HDC having an inlet, connected to the second end of the outlet conduit, and an outlet connected to the second end of the inlet conduit. The HDC is designed to dissipate heat to an external heat sink, thereby cooling the ferrofluid and the carrier gas contained therein to a second temperature (T2), lower than T1, at a second pressure (P2).

b) A reservoir container, connected by a conduit to the outlet of the HDC. The reservoir container designed to further cool the ferrofluid at the outlet of the HDC and to regulate the operating conditions in the converter such that the relationship between T1 and P1 remains within the desired range inside the HAC and the ferrofluid exits the HAC as ferrogas while passing from the HAC to the outlet conduit and such that the relationship between T2 and P2 assures full condensation of the ferrogas to ferrofluid at the outlet of the HDC. The regulation of the operating conditions is accomplished by allowing exchange of ferrofluid stored in the reservoir container with the main circuit such as to lower, or to raise, as required, the overall pressure in the main circuit.

c) valves, for timely opening and closing the first outlet of the HAC and the outlet of the HDC and the inlet/outlet of the reservoir container.

d) A first one-way valve, connected at the inlet of the HAC for allowing ferrofluid to flow only in a direction from the outlet of the HDC to the inlet of the HAC, as a result of the difference in pressure in said HAC and in said HDC.

e) A second one-way valve, connected at the inlet of the HDC, for allowing ferrogas to flow only in a direction from the first outlet of the HAC to the inlet of the HDC, as a result of a the difference in pressure in said HAC and in said HDC.

f) Control means, for timely operating the valves.

g) Magnetic field generation elements, for generating magnetic fields around selected sections of the inlet conduit and the outlet conduit. The magnetic fields having direction and sufficient strength such that the individual magnetic fields of essentially all of the magnetic particles will be aligned by the generated fields when the particles move through the selected sections of the conduits. and h) Electricity conducting wires, coiled around the selected sections of the inlet conduit and the outlet conduit, wherein electric current is induced in the coils of the wires by the aligned magnetic fields of the magnetic particles moving through the coils of the wires.

The cross-sectional area of the HAC is preferably larger than the cross-sectional areas of the outlet conduit, the inlet conduit, and the HDC. The reservoir container preferably has separate inlet and outlet valves.

In a preferred embodiment of the converter of the invention, part of the inlet conduit is routed such that it is connected to the outlet conduit above and below the selected section of the outlet conduit. In this way, a section of conduit is created that is common to both the input conduit and the output conduit. The common section is the selected sections of both the input conduit and the output conduit, i.e. the electricity conducting wires are coiled around the common section of conduit.

A preferred embodiment of the converter of the invention, further comprises:

a) A booster container comprising a booster inlet connected to a second outlet of the HAC and a booster outlet;

b) A booster conduit whose first end is connected to the booster outlet and whose second end is connected to the midsection of the HDC, through a one-way valve that opens as a result of the force exerted thereon by the ferromixture in the booster conduit;

c) Valves located at the second outlet of the HAC and the booster outlet. The activation of each of these valves is controlled by the controller.

d) Magnetic field generation elements, for generating magnetic fields around selected sections of the booster conduit. The magnetic fields having sufficient strength and being orientated such that the individual magnetic fields of essentially all of the magnetic particles in the ferromixture will be aligned when the particles move through the selected sections of the booster conduit; and e) Electricity conducting wires, coiled around the selected sections of the booster conduit, wherein electric current is induced in the coils of the wires by the aligned magnetic fields of the magnetic particles moving through the coils of the wires.

In a preferred version of this embodiment, part of the inlet conduit and part of the outlet conduit have been routed such that they are connected to the booster conduit above and below the selected section of the booster conduit. In this way a section of conduit that is common to the input conduit, the output conduit, and the booster conduit is formed. The common section is the selected sections of the input conduit, the output conduit, and the booster conduit, i.e. the electricity conducting wires are coiled around this common section of conduit.

The converter of the invention may further comprise a by-pass conduit. The first end of which is connected to the HAC through a valve and the second end of which is connected directly to the HDC. The purpose of the by-pass is to allow control of the velocity of flow of the circulating ferrofluid/ferrogas/ferromixture in the main circuit of the converter. The control includes: maintaining the velocity within a desired operating range, reducing the velocity, or completely stopping the circulation. The first end of the by-pass conduit is preferably located closer to the outlet of the HAC than to its inlet, and the second end of the by-pass conduit is preferably located closer to the outlet of the HDC than to its inlet.

In another embodiment of the converter of the invention, the HAC is divided into two longitudinal sections, an inlet section connected to an outlet section through a one-way valve or filter. Also the HDC is divided into two sections, an inlet section connected to an outlet section through a one-way valve. When the pressure in the respective inlet section exceeds the pressure in the respective outlet section, the respective valve opens allowing ferrofluid/ferrogas/ferromixture to flow from the respective inlet section to the respective outlet section.

Preferred embodiments of the converter are provided with one or more optical arrangements located near one or more of the valves and/or in one or more of the conduits. The optical arrangement is for collecting light rays and for focusing the collected light rays in order to raise the temperature of the ferromixture at the location of the optical arrangement. This increases the velocity of the magnetic particles that are suspended in the ferromixture. The optical arrangement preferably comprises a window that is formed in the walls of the conduit. The window can comprise an activated shutter, which is opened and closed by the control system either in synchronization with the operation of the valves or according to conditions in the surroundings. The optical arrangement can comprise a heliostat.

In a preferred embodiment of the invention, the HAC is positioned on the top side of the wind wing of a sea wave energy converter and the HDC is installed on the bottom side of the wind wing of the sea wave energy converter.

In another aspect, the invention is a method for converting thermal energy into electrical energy in a converter whose main circuit is initially filled with ferrofluid and carrier gas. The main circuit comprises:

a) A Heat Absorbing Container (HAC), designed and located such that it is capable of absorbing heat from an external heat source. The HAC has an inlet, connected to the first end of an inlet conduit, and a first outlet, connected to a first end of an outlet conduit.

b) An elongate Heat Dissipating Container (HDC), designed and located such that it is capable of dissipating heat to an external heat sink. The HDC has an inlet, connected to the second end of the outlet conduit, and an outlet connected to the second end of the inlet conduit.

c) Valves d) Control means, for timely operating the valves;

e) Magnetic field generation elements, for generating magnetic fields around selected sections of the inlet conduit and the outlet conduit. The magnetic fields have sufficient strength and are orientated such that the individual magnetic fields of essentially all of the magnetic particles will be aligned by the generated fields when the particles move through the selected sections of the conduits. and f) Electricity conducting wires, coiled around selected sections of the conduits;

The method is based on controlling the local temperature and pressure at different locations in the main circuit in order to make the magnetic particles initially suspended in the ferrofluid to circulate in a closed-loop in the main circuit. Thus an electric current will be induced in the coils of the wires when the aligned magnetic fields of the magnetic particles move through them.

According to the method of the invention the electricity is generated by the following steps:

a) allow heat to be absorbed by the HAC, from an external heat source, thereby increasing the temperature of the ferrofluid and carrier gas and the pressure inside the HAC;

b) open valves at the first and second ends of the outlet conduit, thereby allowing the high pressure carrier gas to push ferrofluid out of the HAC. The ferrofluid changes phase to ferrogas and releases the suspended magnetic particles, which are then carried through the outlet conduit towards the HD C by the ferromixture and carrier gas;

c) utilize the higher pressure in the HAC and the outlet conduit to force ferromixture, into the HDC, thereby raising the pressure of the gas in the HDC;

d) cooling the ferromixture in the HDC, thereby condensing the ferrogas in the ferromixture to ferrofluid;

e) close the valves at the first and second ends of the outlet conduit and open valves at the first and second ends of the inlet conduit, when the difference in pressure in the HDC and in the HAC reaches a predetermined value, thereby allowing ferrofluid and carrier gas to be pushed from the HDC to the HAC through the inlet conduit;

f) commencing the next cycle of operation, by repeating steps a) to e); and g) in each cycle, aligning the magnetic fields of the magnetic particles as they pass through selected sections of the inlet and the outlet conduits, around which selected sections electricity conducting wires are coiled;

thereby inducing electric currents in the coils of electricity conducting wires.

In another embodiment, the converter additionally comprises one or more of the following:

a) a reservoir container, connected by a conduit to the outlet of the HDC;

b) a booster container comprising a booster inlet connected to a second outlet of the HAC and a booster outlet connected to the first end a booster conduit whose second end is connected, through a one-way valve to the midsection of the HD C;

c) a by-pass conduit, the first end of which is connected to the HAC through a valve and the second end of which is connected directly to the HDC, the by-pass allowing control of the velocity of flow of the circulating ferrofluid/ferrogas/ferromixture in the main circuit of the converter;

d) an HAC which is divided into two longitudinal sections, an inlet section connected to an outlet section through a one-way valve or one-way filter;

e) an HD C which is divided into two sections, an inlet section connected to an outlet section through a one-way valve; and f) one or more optical arrangements located near one or more of the valves or near one or more of the areas where electricity is produced.

When the converter comprises these additional components the electricity is generated by the following steps:
a) allow heat to be absorbed by the HAC, from an external heat source, thereby increasing the temperature of the ferrofluid and carrier gas and the pressure inside the HAC;
b) open valves at the first and second ends of the outlet conduit, thereby allowing the high pressure carrier gas to push ferrofluid out of the HAC. The ferrofluid changes phase to ferrogas and releases the suspended magnetic particles, which are carried through the outlet conduit towards the HDC by the ferromixture and carrier gas;
c) utilize the high pressure in the HAC and the outlet conduit to force ferromixture, into the HDC, thereby raising the pressure of the gas in the HDC;
d) cooling the ferromixture in the HDC, thereby condensing the ferrogas in the ferromixture to ferrofluid;
e) close the valves at the first and second ends of the outlet conduit and open valves at the first and second ends of the inlet conduit, when the difference in pressure in the HDC and in the HAC reaches a predetermined value, thereby allowing ferrofluid and carrier gas to be pushed from the HDC to the HAC through the inlet conduit;
f) commencing the next cycle of operation, by repeating steps a) to e); and
g) in each cycle, aligning the magnetic fields of the magnetic particles as they pass through selected sections of the inlet and the outlet conduits, around which selected sections electricity conducting wires are coiled;

In this way, electric currents are induced in the coils of electricity conducting wires.

The converter may comprise a booster container comprising a booster inlet connected through a valve to a second outlet of the HAC and a booster outlet connected through a valve to the first end of a booster conduit whose second end is connected, through a one-way valve to the midsection of the HDC. In this case, the method comprising the additional steps of:
h) opening the valve at the booster outlet at step b);
i) open the valve at the first end of the booster conduit when the pressure difference between the gas in the booster container and the HDC reaches a predetermined value;
j) close the valve at the booster outlet at step e); and
k) close the valve at the first end of the booster conduit when the pressure difference between the gas in the booster container and the HDC reaches a predetermined value.

The converter may comprise a by-pass conduit, the first end of which is connected to the HAC through a valve and the second end of which is connected directly to the HDC. In this case, the method comprises the additional step of opening the valve at the first end of the by-pass conduit when necessary, thereby reducing the difference in the pressures inside the HAC and the HDC. Carrying out this step will change the velocity of flow of the circulating ferrofluid/ferrogas/ferromixture in the main circuit of the converter.

If the converter comprises one or more optical arrangements located near one or more of the valves, the optical arrangements can also comprise shutters. In this case, the method comprises the additional step of opening the shutter at an appropriate time to increase the localized temperature of the ferrofluid/ferrogas/ferromixture in the focal zone of the optical system.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

The energy converter of the invention is basically a device capable of absorbing heat from an external heat source and producing electricity while delivering a portion of the heat to a cold temperature reservoir. The external heat source, which provides the required heat to the converter, can be essentially any heat source. For example, the heat can be provided by a nuclear power station, or from an air condition system, or a compressor or any operating engine or an electric motor. In the preferred embodiment the heat source is the surrounding environment and solar radiation. In contrast to conventional industrial power plants, the present system does not use energy consuming machinery such as compressors or pumps. The working substance of the energy converter of the invention is a ferrofluid with intrinsic magnetic properties instead of superheated steam that is usually utilized in conventional power plants to drive a turbine. The ferrofluid coexists together with its vapor in a large chamber, which absorbs heat from the external source. In order to control the boiling temperature of the ferrofluid, a non-reacting gas may be inserted into the chamber. This gas must have a very low boiling temperature so that it will always remain in gas phase. Air, for example, is an appropriate choice. The hot ferrofluid emerges from the chamber into a pipe and is vaporized while exiting the valve connecting them. The vapor contains very small magnetic particles and is at high pressure. As the particles move through the closed-loop converter, they produce in windings of an electrical wire an electrical current. After passing through the region surrounded by the coil of wire, the vapor enters a condenser in which it is liquified at low pressure and temperature. The liquid from the condenser is then returned, passing through another coil of electric wire, to the main heating chamber.

The present invention utilizes the following phenomena:
1) When, for example in a spray paint gun, compressed air is forced to flow at a high speed through a restricted region in a pipe, the pressure of the flowing air after the restriction is reduced, allowing liquid paint is be drawn into the air stream. This phenomenon is utilized in the first step of this invention, in which the magnetic particles are carried by ferrogas from the HAC to the HDC.

2) It is known that when a gas, or a mixture of a liquid and gas, is compressed, its temperature rises. Also whenever a gas or a gaseous mixture is forced to flow from a conduit into and through a narrower conduit, its pressure increases and its temperature rises. The increase is a function, among other things, of the ratio between the cross-sectional areas of the two conduits. The opposite phenomenon occurs whenever a gas, or a mixture, moves from a conduit to a wider conduit. The present invention utilizes differences in conduit diameters to cause changes in the pressure and temperature of the ferromixture, as described in detail hereinbelow.

Figure 1:
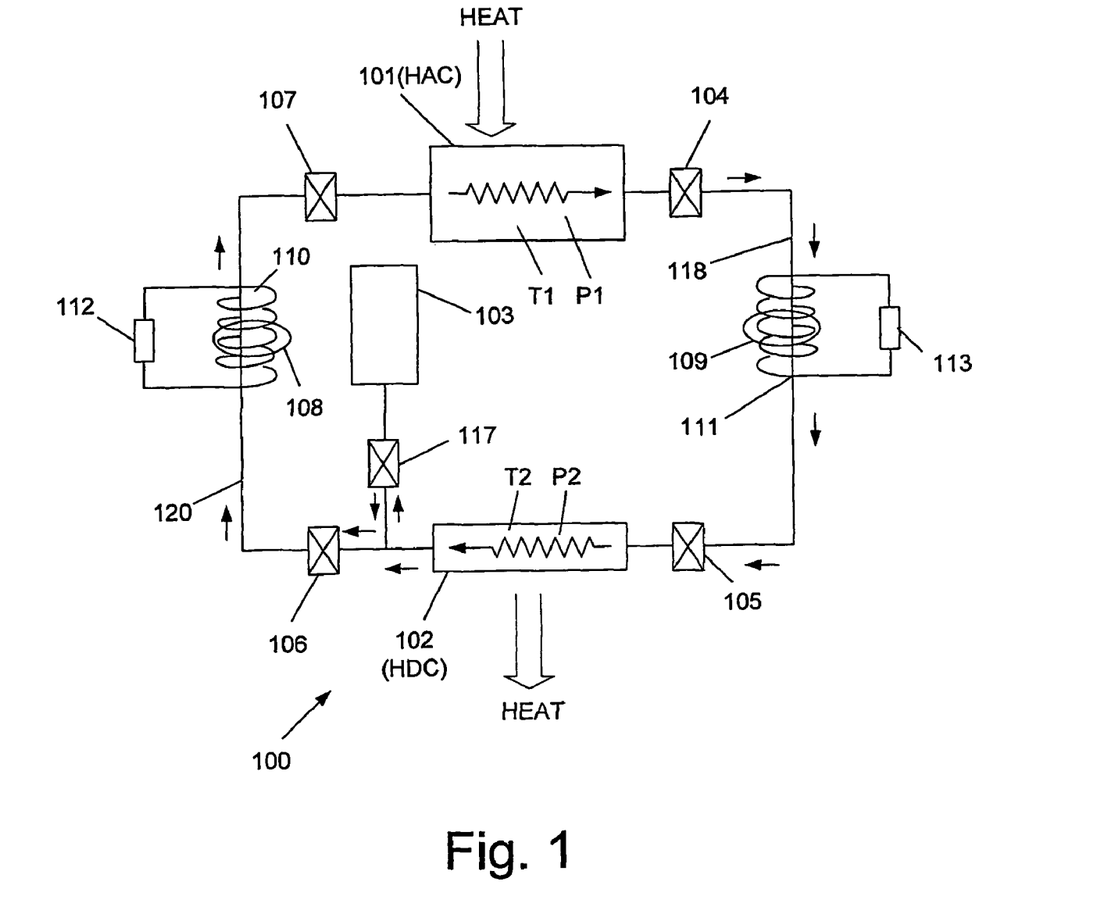
FIG. 1 schematically illustrates the general layout and functionality of the converter, according to one embodiment of the present invention.

After filling the closed-loop converter with ferrofluid and carrier gas (i.e., at the manufacturing stage) in a ratio_of ferrofluid to carrier gas of about 1:4, HAC 101 inlet and outlet valves 107 and 104, respectively, HDC 102 inlet and outlet valves 105 and 106, respectively, and valve 117 are all in the "closed" state to start the first step of the first cycle of generation of electricity as described hereinafter. The ferrofluid contained in HAC 101, in HDC 102 and in the conduits which connect them to one another (118 and 120), is caused to circulate in the closed-loop converter in the manner described hereinafter.

FIG. 1 schematically illustrates a simplified embodiment of the converter of the present invention, in order to describe the general layout and principle of operation of the converter. In all of the figures, the small arrows placed next to the conduits indicate the direction of flow of the ferrofluid/ferrogas/ferromixture through the conduit. HAC 101, elongate HDC 102, and the conduits that connect them to form a closed-loop system, are partially filled with ferrofluid and carrier gas. Initially, the pressure of the carrier gas in the HDC is lower than atmospheric pressure, to allow boiling of the ferrofluid at lower temperatures than would have been possible at atmospheric pressure. HAC 101 and the ferrofluid and carrier gas in it absorb heat from an external source, such as the sun, to heat the ferrofluid and gas to a first temperature (T1), and, at the same time, HDC 102 dissipates heat to an external heat sink, cool the ferromixture contained therein to a second temperature (T2), lower than the first temperature.

As HAC 101 absorbs heat from the external heat source, the temperature of the ferrofluid contained therein starts to increase to a first temperature, causing the pressure inside HAC 101 (P1) to increase. At the same time, the ferrofluid is cooled in HDC 102 to a second temperature, lower than the first temperature, causing the pressure inside HDC 102 (P2) to decrease. In other words, the difference between the first and the second temperatures is translated into a corresponding difference in the pressure inside HAC 101 and HDC 102. The difference between these pressures (i.e., P1–P2) is the force that will cause the magnetic particles to circulate in the closed-loop converter as described hereinbelow. The actual values of P1, P2, T1, and T2 that will result in safe operation and maximum efficiency of the converter of the invention have to be determined for each specific design of the converter. These values depend, upon many other factors on the materials of which the various parts of the reactor are built, wall thickness, etc. For example, if the HAC is made of non-reinforced glass, it is recommended to not allow P1 to exceed approximately three atmospheres.

When the pressure difference (P1–P2) reaches some predetermined threshold value, valves 104 and 105 are opened, either essentially simultaneously or one after the other, to initiate the first step of the second cycle. As mentioned hereinbefore, reducing the pressure of the gas in contact with a liquid decreases the boiling temperature of the liquid. Accordingly, because the pressure in conduit 118, at this stage, is lower than the pressure in HAC 101, the liquid carrier of the ferrofluid (which was kept up till this stage—in HAC 101—as liquid, because of the higher pressure in HAC 101), now evaporates and becomes a gaseous jet that carries magnetic particles from HAC 101 into the direction of HDC 102, along conduit 118. The gaseous jet pushes the (colder) ferrofluid and carrier gas in conduit 118 and in HDC 102 towards valves 106, 107 and 117. The gas-liquid mixture pushing against the ferrofluid inside HDC 102 increase the pressure (P2) and temperature (T2) in HDC 102. As P2 increases, the temperature of the content of HDC 102 increases also. Simultaneously, the pressure P1 decreases, and the temperature (T1) inside HAC 101 decreases as the ferrofluid is expelled from it.

When P2 reaches a maximum value, valves 104 and 105 are closed, to complete thereby the first step of the second cycle. Then, valves 106 and 107 are opened, and the overpressure in HDC 102 relative to the pressure in HAC 101, pushes the condensed ferrogas through valve 106, towards HAC 101, through conduit 120. When the pressure P1 in HAC 101 reaches a maximum value, valves 106 and 107 are closed, whereby completing the second step and the entire second cycle.

Now, the next cycle begins, wherein: (1) HAC 101 absorbs external heat to raise the temperature of the (now) cold ferrofluid contained therein to the first temperature (T1), and (2) HDC 102 dissipates heat to the heat sink, lowering the temperature of the (now) hot ferrogas and ferrofluid contained therein to the second temperature (T2), and (3) operating valves 104 to 107 as described in connection with the first cycle described hereinabove. Unless converter 100 malfunctions or it is necessary for some reason, to halt the operation of the converter, one cycle will follow another cycle with, at each cycle, some portion (i.e., a 'batch') of the ferrofluid being exchanged between HAC 101 and HDC 102. In this manner, a substantially continuous flow of batches of ferrofluid occurs in the closed-loop converter. This flow is utilized to induce electric current in an electric wire, as will be described hereinbelow.

Electricity conducting wires 110 and 111 are coiled around conduits 120 and 118, respectively. The magnetic particles flowing through these conduits should induce electric currents in wires 110 and 111, which are connected to loads 112 and 113. However, since the magnetic particles are aligned randomly (with respect to one another) in their carrier (whether a liquid or a gas, depending on the location in the converter and on the stage of the cycle), their net magnetic field is essentially zero. Under such circumstances no current will be induced in electric wires 110 and 111. In order to produce electric current, the magnetic particles must be aligned in such a way as to produce a non-zero net magnetic field moving through the coiled electric wires (110 and 111). This alignment is implemented by the use of for example magnetic rings 108 and 109 which are located so as to generate a constant magnetic field at sections of the closed-loop converter surrounded by coil of wires and through which the ferrofluid and ferrogas flow. It is to be understood, that the coils of wire 110 and 111 are shown symbolically only and can represent, for example a plurality of coils connected in series or any other arrangement suitable to meet the requirements of the invention. Similarly the alignment magnets 108 and 109 are shown symbolically only and can represent, for example a plurality of bar magnets or any other arrangement known in the art for creating a uniform magnetic field in a given region. Also, there can be more than one electricity producing region located along the length of the conduits 118 and 120.

Magnetic rings 108 and 109 are shown encircling conduits 118 and 120 in order to generate magnetic fields that will align the magnetic particles with their longitudinal axis substantially coinciding with the longitudinal axis of the conduits. In this way, the flow of the magnetic particles will produce a local non-zero magnetic field that induces an electric current in electric wires 110 and 111.

In order to further control the operating conditions within the converter, a reservoir container 103 is provided.

Reservoir container 103 is initially partially filled with ferrofluid, and it is used according to one of the following two scenarios:

(1) The ferrofluid contained in the reservoir container is utilized for cooling, per each cycle of operation of the converter, the ferromixture at the outlet of HDC, by opening its valve, immediately after completing the first step of the cycle, whereby releasing cold ferrofluid from the reservoir container 103 to the outlet of the HDC 102. The reservoir container is refilled with cold ferrofluid in each cycle of operation of converter, which can be added to the amount of cold ferrofluid released at the outlet of HDC 102 in the successive cycle.

(2) In order to cause the ferrofluid in HAC 101 to turn into gas, while flowing through the outlet valve 104 of HAC 101, it is essential to maintain a certain relationship between the temperature and the pressure of the ferrofluid on both sides of valve 104. Because of possible unstable ambient conditions, the relationship must be adjustable within some known operating range. The aforesaid relationship is maintained in the following way: if the temperature inside HAC 101 decreases, the pressure in HAC 101 must be reduced such that the boiling temperature of the ferrofluid in HAC 101 will be decreased as well, to allow it to boil at the lower temperature. The pressure in HAC 101 is reduced by reducing the overall pressure in the converter 100, by filling the reservoir container 103 with some of the ferrofluid. This is done by opening valve 117 only when the pressure in HDC 102 is higher than the pressure in the reservoir container 103. Likewise, when the temperature in HAC 101 increases, the pressure in HAC 101 must be increased as well, to maintain the aforesaid relationship. The required increase in this pressure is obtained by increasing the overall pressure in the main circuit of converter 100, by addition of at least some of the ferrofluid contained in the reservoir container 103. This is done by opening valve 117 only when the pressure in the reservoir container 103 is higher than the pressure in HDC 102, a situation that might occur essentially at any stage of an individual cycle of operation.

Normally, valve 117 should open or close in order to cool the ferromixture, as described hereinabove in connection with the first scenario. However, if there is a need to increase or to decrease the overall pressure in the converter 100, as described hereinabove in connection with the second scenario, then the second scenario will prevail; i.e., valve 117 will operate according to the second scenario, to assure that the converter 100 operates within the preferred operating range, and, therefore, that the converter maintains the highest efficiency possible for the given ambient conditions.

Figure 5:
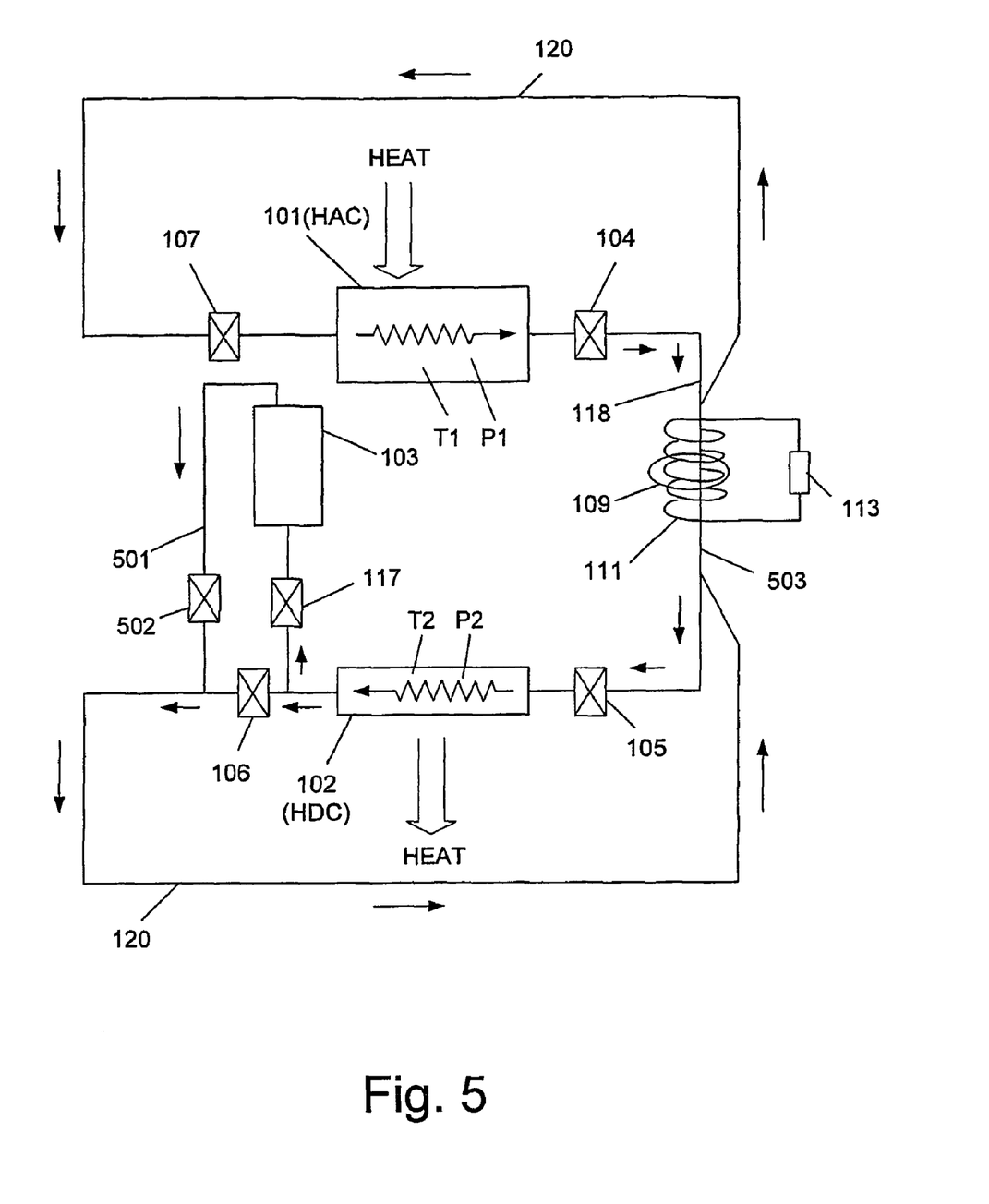
FIG. 5 schematically illustrates an embodiment of the converter of the invention.

A more efficient method of working with reservoir container 103 is shown in FIG. 5. In this embodiment reservoir container 103 is provided with a separate outlet through exit pipe 501 and exit valve 502. In this manner, the ferrofluid flows through the reservoir 103 in a continuous direction with warmer ferrofluid entering at valve 117 and colder ferrofluid exiting through valve 502. This results in colder ferrofluid being added to the flow through conduit 120 than in the embodiment shown in FIG. 1, thereby increasing the efficiency of converter 100. With reservoir 103 connected to the converter in the manner shown in FIG. 5, opening and closing the appropriate combinations of valves 106, 117, and 502 allows either no ferrofluid to flow into conduit 120 or ferrofluid to flow into conduit 120 through either HDC 102, reservoir 103, or through both of them.

Figure 2:
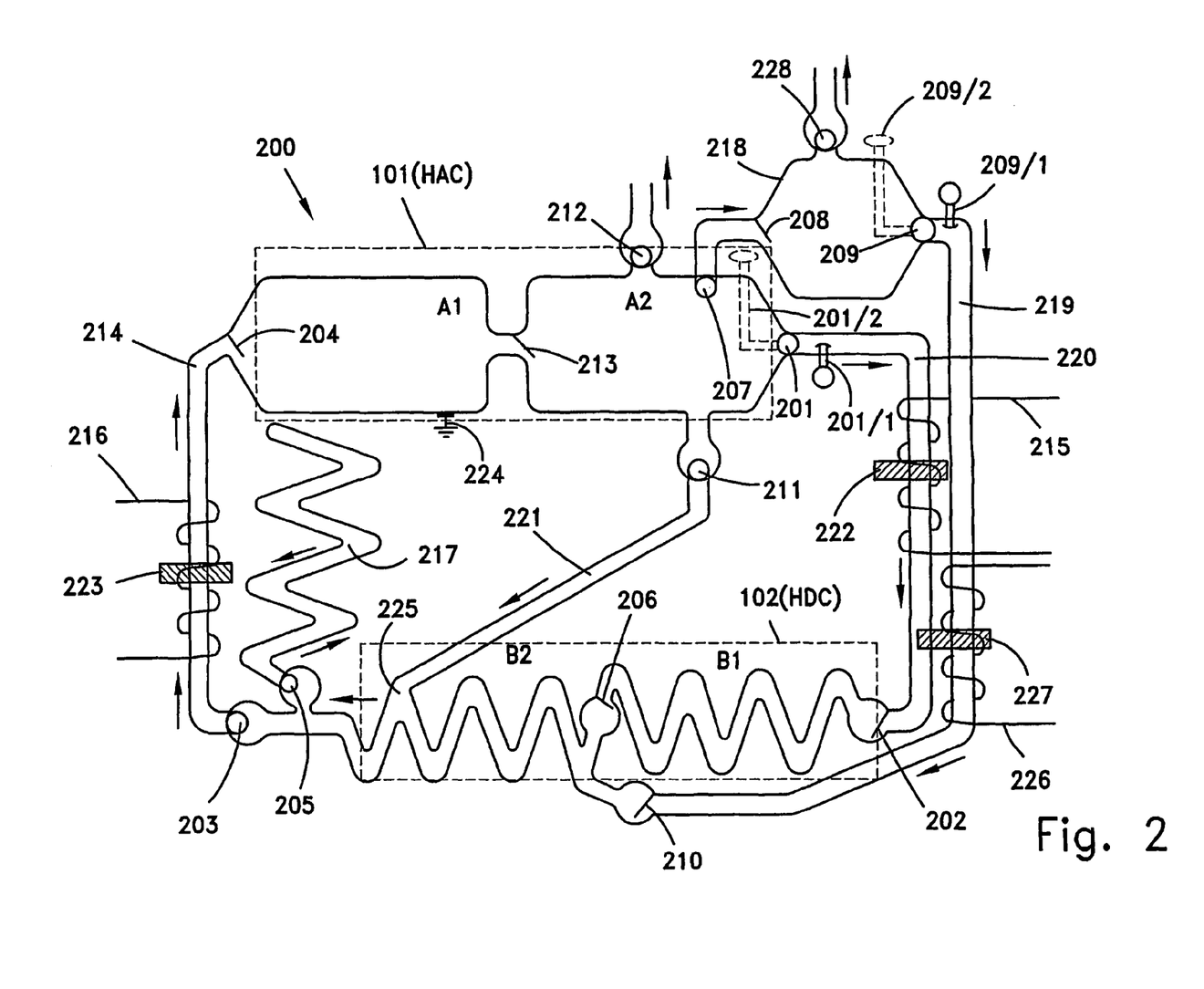
FIG. 2 schematically illustrates a layout and functionality of the converter, according to a preferred embodiment of the present invention.

FIG. 2 schematically illustrates the converter according to a preferred embodiment of the present invention. Referring to this figure, valves 208, 202, 206, 210, 204 and 213 are mechanical one way valves, which open and close according to the difference in the pressure on both sides of the valve. Each one of these valves can be provided with a spring to close the valve when the pressure difference on it is essentially zero, or, alternatively, the spring can be chosen to have a stiffness such that the valve will remain in the "closed" state as long as the counter (i.e., "opening") force exerted thereon is smaller than a predetermined value. Valve 213 located in HAC 101 can be a one-way filter, that allows the passage of ferrofluid but will confine the ferroparticles released from the ferrofluid when the temperature rises from in section A2 of the HAC.

Still referring to FIG. 2, the activation of valves 207, 201, 209, 205 203, and 211 is controlled by a controller (mechanical or electronic, not shown), which is configured to respond to input signals indicative of pressures and temperatures at the relevant locations in the converter. By 'relevant location' is meant the locations at which the value of the temperature, pressure, or both pressure and temperature, is measured to activate the valves at the correct instants during each cycle of operation of the converter. There is a very large selection of commercially available pressure and temperature sensors (not shown in the figures), as well as valves and controllers, from which any person skilled in the art can choose for the purpose of the invention.

For the purpose of simplifying the description of the operation of the embodiment of the converter shown in FIG. 2, it is assumed that all the valves are initially in the "closed" state and the converter contains ferrofluid and carrier gas at a predetermined ratio, for example the ration of ferrofluid to carrier gas can be about 1:4, and quantities that depend on the dimensions of the converter 200, the ambient conditions, operation frequency and desired electrical output of the converter 200. Reservoir container 217 is placed in a relatively cold place, for example, near the HDC, whereas the HAC is placed in a hotter location. Reservoir container 217 is initially and partially filled with ferrofluid and carrier gas at ambient temperature in the 1:4 ratio noted above.

Container 218 (a 'booster' container) is located between the outlet of HAC 101 (A2) and a midsection of HDC 102. Container 218 contains, in each cycle of operation of the converter 200, ferrofluid that is maintained under pressure of carrier gas, for further 'boosting' the flow of ferrofluid/ferromixture from B2, as described in detail hereinbelow.

HAC 101 is shown divided into two sections, A1 and A2. Likewise, HDC 102 is shown divided into sections B1 and B2. A1 and A2 function to create conditions for an acceleration phase (of ferrofluid) inside 101. Likewise, B1 and B2 function to obtain an acceleration (of ferromixture) inside 102.

At the beginning of the electricity generating process, the carrier gas in A2 is at predetermined starting pressure. The starting pressure is such that for the effective temperature, which is the sum of the ambient temperature and the temperature rise due to the accumulated solar heat, the ferrofluid will turn from liquid into gas while passing from A2 to outlet conduit 220, and from container 218 to conduit 219. As heat starts to accumulate inside A2, the temperature of the ferrofluid and the gas inside A2 starts to increase, and therefore, the pressure inside A2 starts to increase. When the pressure in A2 reaches the predetermined starting pressure, valve 201 is opened. Simultaneously, valves 202 and 207, and thus valve 208, are opened as well, initiating a cycle of operation. As a result of the opening of these valves, some of the pressurized ferrofluid in A2 flows into 'booster' container 218 and another portion thereof flows as ferrogas into B1 through outlet conduit 220. Because the ferrogas in the outlet conduit 220 is at relatively high pressure and is 'injected' into the elongate container B1 from outlet conduit 220, a compression force is exerted on the ferromixture contained therein. Under these conditions, temperature of B1 increases, which makes the heat dissipation phase from B1 to the heat sink more efficient.

When the ferrogas enters B1, it starts to condense to form a ferromixture with a relatively high content of gas, and as the mixture flows towards valve 206, the ferromixture further gradually condenses, and, therefore, the ferromixture at 206 will contain a lower portion of gas then at 202.

When the pressure in B1 is higher than the pressure in B2, valve 206 opens to allow the transfer of ferromixture from B1 to B2, thus increasing the pressure in B2. Valve 206 is oneway valve, which is automatically closed when the pressure in B2 is essentially equal to, or greater than, the pressure in B1. The closure of valve 206 does not permit ferromixture to return from B2 to B1. The closure of valve 206 sends a signal to the controller to close of valves 201 and 202.

As noted hereinbefore, valves 207 and 208 were opened to allow the pressure in container 218 to rise. When the pressure in booster container 218 becomes higher than the pressure in A2, valve 208 is closed, causing valve 207 to close as well.

Closing valve 206, at the instant mentioned before, causes the opening of valves 203, 204, 209 and 210. Therefore, the ferrofluid that is under high pressure in booster container 218 is expelled from 218 and, and as it passes from booster container 218 to the booster conduit 219, the ferrofluid changes its phase from ferrofluid to ferrogas. The high pressure ferrogas travels at high velocity through booster conduit 219, and pushes the relatively cold ferromixture from B2 towards A1, through (now) opened valves 209, 210, 203, and 204. Because the ferrofluid flows from relatively narrower inlet conduit 214 into a much wider container A1, its temperature further decreases (which makes the heat absorption phase in A1 more efficient). While ferrofluid flows into A1, the pressure inside A1 increases and additional increase in this pressure is obtained while A1 absorbs external heat. At some point, the pressure in A1 will be higher than the pressure in A2, in which case, valve 213 is opened, to allow, thereby, ferrofluid to be transferred to A2. At another time, the pressure in A2 will tend to be higher than the pressure in A1, which will cause oneway valve 213 to close. The closure of valve 213 indicates the completion of one cycle of operation of the converter. The closure of valve 213 causes valves 203, 204, and 209 and 210, to close as well, and at the same time, the closure of valve 213 causes valves 201 and 207 to open, to start another cycle, essentially as described hereinabove.

Reservoir container 217, rings 222, 223 and 227, and wires 215, 216 and 226, function in the same way as container 103, rings 108 and 109, and wires 110 and 111 (FIG. 1).

Figure 6:
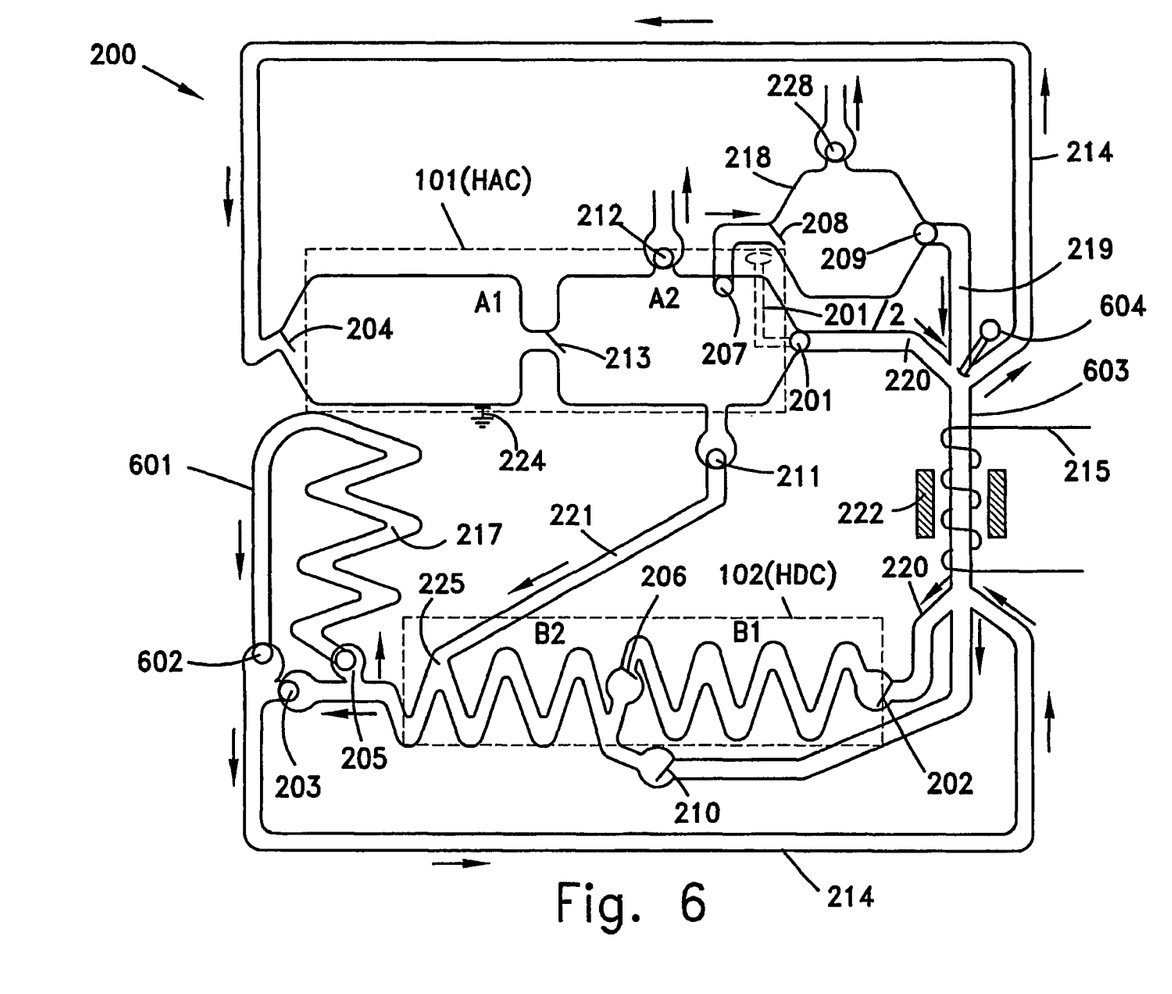
FIG. 6 schematically illustrates an embodiment of the converter of the invention.

As is the case with reservoir container 103 (FIG. 1), a more efficient method of working with reservoir container 217 is shown in FIG. 6. In this embodiment reservoir container 217 is provided with a separate outlet through exit pipe 601 and exit valve 602. In this manner, the ferrofluid flows through the reservoir 217 in a continuous direction with warmer ferrofluid entering at valve 205 and colder ferrofluid exiting through valve 602. This prevents mixing of the relatively cold and warm ferrofluid in reservoir 217 and results in colder ferrofluid being added to the flow through conduit 214 than in the embodiment shown in FIG. 2, thereby increasing the efficiency of converter 200. Opening and closing the appropriate combinations of valves 203, 205, and 602 allows either no ferrofluid to flow into conduit 214 or ferrofluid to flow into conduit 214 through either HDC 102, reservoir 217, or through both of them.

Safety means are provided to prevent the occurrence of the following events:

1) The pressure in A2 increasing above the planned operating range. This is an indication that the ferrofluid/ferrogas/ferromixture circulates with a velocity that tends to increase to progressively high levels. If the increase of velocity is not interrupted in time, then the overall pressure in the converter will increase to dangerous levels. In order to prevent this from happening, when a predetermined threshold pressure is exceeded, a controller sends a signal to open valve 211 momentarily to permit hot ferrofluid to flow through by-pass conduit 221 directly from A2 to B2. Valve 211 can be used also for slowing down the operation of the converter, should the need arise for any reason, such as when there is a need for routine maintenance or to replace a malfunctioning part.

2) If valve 211 malfunctions or, if for any other reason, the pressure in the converter rises above predetermined dangerous levels then pressure safety valves 212 and 228 permit release of gas outside the converter, to reduce the pressure in A2 and/or in container 218, respectively.

The high velocity of flow of the ferrofluid/ferrogas in the converter may result in the creation of dangerous static electrical charges. In order to prevent the accumulation of such charges, it is essential that the relevant components of the converter be connected to the earth, to allow discharging charges to the earth. An exemplary connection is schematically shown in FIG. 2, by reference numeral 224.

In another embodiment of the invention, optical elements are provided to focus solar radiation inside the outlet conduit 201 and 209 (optical elements 201/1 and 209/1, respectively, in FIG. 2). The light is focused through a window in the wall of the conduit. The window is provided with an electrically activated shutter. The shutter can be opened and closed either totally or partially and can be operated in several different modes, foe example, opened completely when valves 201 and 209 open, and closed completely when these valves close. Such an optical arrangement will add additional heat to the ferrogas in the outlet conduits, increasing the temperature, pressure, and velocity of the gas. Since the electric current generated in the coils 215, 216 and 226 depends, upon other factors on the velocity of the magnetic particles, the optical arrangements will increase the output of converter 200.

In another embodiment, the activated valve (201) connected to the first outlet of the HAC and the valve (209) connected to the outlet of the booster are each provided with an optical arrangement, (201/2) and (209/2), respectively, for collecting light rays and for focusing the collected light rays such as to raise the temperature of the ferromixture as it passes through the valve. The optical arrangement is arranged such that the focused light rays pass through the opening in the corresponding valve and the location of the corresponding focal point changes with the movement of the respective valve such that light rays are focused on the entrance to the valve whenever the valve is in the "open" state, and dispersed or blocked otherwise.

The design of an appropriate optical system, which preferably includes a heliostat, is within the ability of skilled persons and will not be further described herein.

FIG. 5 and FIG. 6 show embodiments of the converter of the invention that are improvements of the embodiments shown in FIG. 1 and FIG. 2 respectively. In the embodiments shown in FIG. 5 and FIG. 6, the conduits are rerouted, in such a way that allows a reduction in the number of places in the converter in which electricity producing means are provided. This simplifies the design and may reduce the cost of the converter.

Considering FIG. 5 and comparing it with FIG. 1, it can be seen that conduit 120 has been rerouted, connecting up to conduit 118 above and below coil 111. In this arrangement there is a section of conduit 503 that is common to both conduits 120 and 118. Section 503 passes through the center of coil 111. Since valves 106 and 107 are closed when valves 104 and 105 are open and vice versa for part of the cycle the ferromixture will flow downward through section 503 and for part of the cycle ferromixture will flow upwards through section 503 producing electricity in both cases. The embodiment shown in FIG. 5 also has conduit 501 and valve 502 to provide an exit for the ferrofluid from the reservoir 103 as discussed hereinabove.

Considering FIG. 6 and comparing it with FIG. 2, it can be seen that conduit 214 has been rerouted, connecting up to conduits 219 and 220 above and below coil 215. In the embodiment shown in FIG. 6, one-way valves 202, 204, 210, and 602 can not open freely, but must be controlled by the system of the converter to prevent back-flow in the conduits. In this arrangement there is a section of conduit 603 that is common to conduits 214, 219, and 220. Section 603 passes through the center of coil 215. In this embodiment, the order in which the valves open and close such that valves 203 and 204 open only after valves 209 and 210 close and not simultaneously with them as in the case of the embodiment shown in FIG. 2 and described hereinabove. In this way, the flow of ferromixture in section 603 will be in one direction only. The embodiment shown in FIG. 6 also has conduit 601 and valve 602 to provide an exit for the ferrofluid from the reservoir 217. It is to be noted that if it is desired that ferrofluid enter conduit 214 from both the HDC 102 and the reservoir 217, then valves 602 and 203 open and close at the same time.

The high velocity of the magnetic particles carried by the ferrogas in the conduits of the converter might cause mutual erosion of both the magnetic particles and the interior surfaces of the conduits and the valves through which the magnetic particles pass. One way of minimizing the erosion is to create external magnetic fields to guide the ferroparticles to assure that they are forced by the magnetic field to form a narrow beam that does not contact the sides. Such a solution could be employed for protecting particularly vulnerable regions of the converter such as the valves.

In the embodiments shown in FIG. 2 and FIG. 6, B1 and B2 (i.e., the HDC) can be effectively cooled by spraying thereon water, and by rapid evaporation thereof. The evaporation process is preferably made more efficient by utilizing wind. In co-pending International Patent Application No. PCT/IL2004/001186, the inventor of the present invention describes an energy converter unit (a "sea wave converter") that converts the energy of sea waves and wind into electrical energy. The sea wave converter consists of a first wing ('wave wing'), to engage the sea waves, and a second wing ('wind wing') to engage the wind. The sea wave converter, the detail structure and functionality of which are described in the above referenced PCT application, is schematically illustrated in FIGS. 3 and 4, which are described hereinafter.

Figure 3:
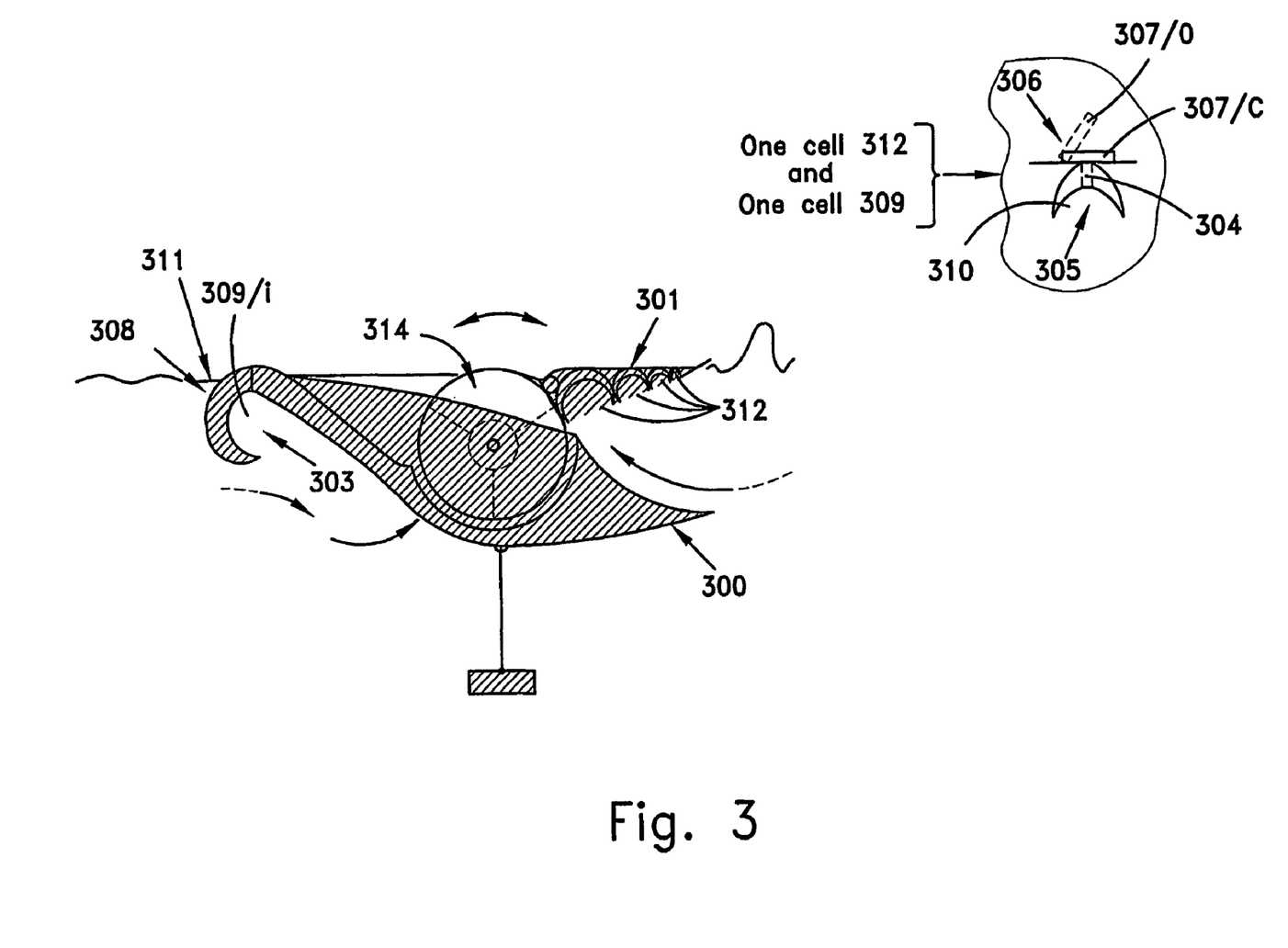
FIG. 3 (prior art) schematically illustrates a sea-eave energy converter based on a wave wing.
Figure 4:
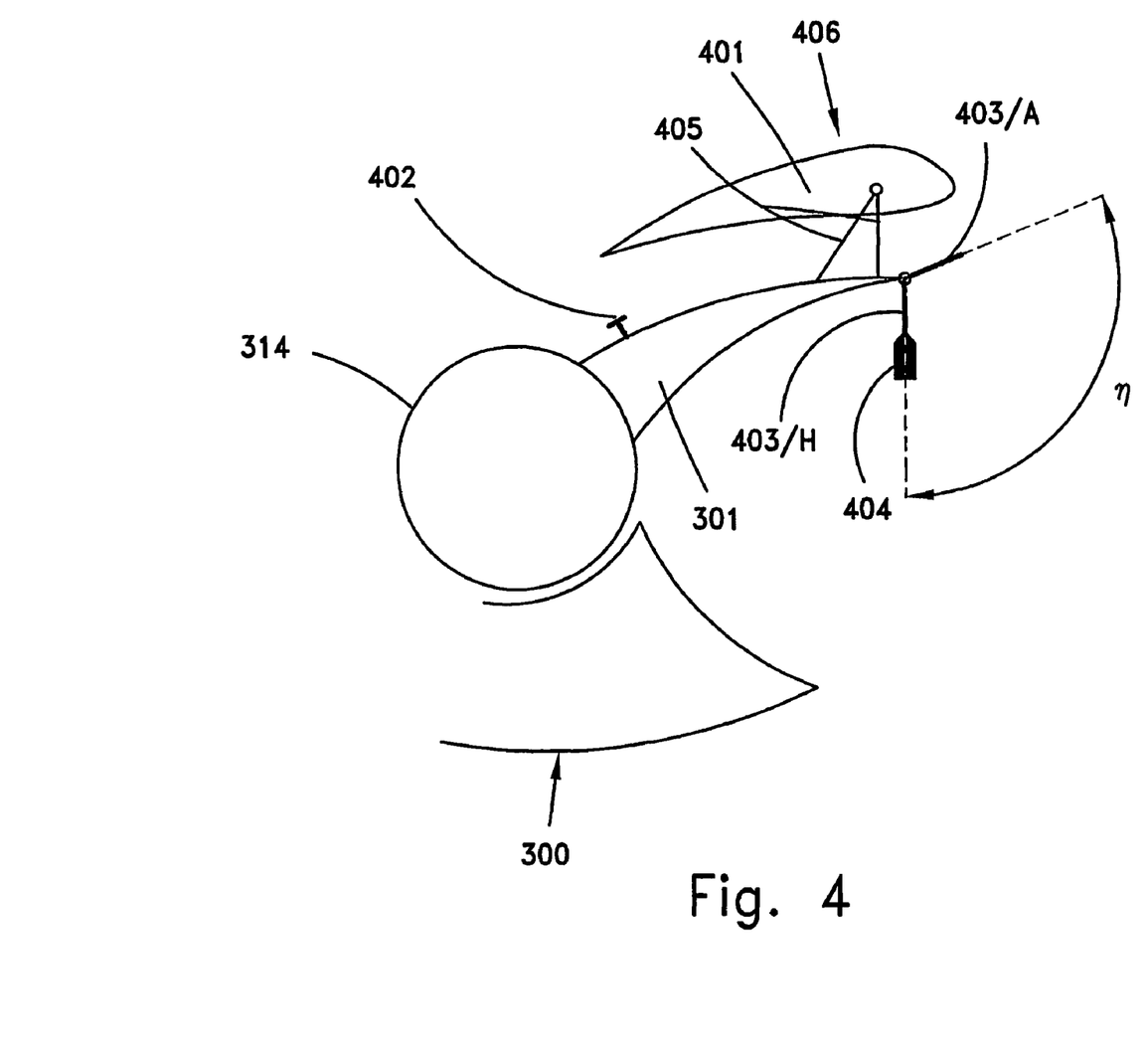
FIG. 4 schematically illustrates the sea-wave energy converter with additional wind wing.

Referring to FIGS. 3 and 4, the sea wave energy converter includes a first (i.e., a wave) wing 301 and a second (i.e., a wind) wing 401 (FIG. 4). Only the wave wing 301 is shown in FIG. 3, for simplicity. The wave energy converter comprises, in addition to the aforesaid two wings, a wing trailing edge supporting means 402, pivotable flap 403, to which a flap weight is connected (404), and pivot supporting means 405, for pivotally supporting the leading edge (the edge facing the wave side) of wing 401. Pivotable flap 403 comprises an airfoil 403/A and a hydrofoil 403/H sections, which form a fixed angle η. Wing 401 is longitudinally located along the wing 301, and it is structured to resemble a typical wing of an airplane and is intended to function as such. Wing 401 is preferably structured to be as light as possible, such as by using light and resilient materials (metal and/or plastics) and, optionally, by leaving hollowed cavities therein, to obtain as much elevation force as possible. However, if desired, the mass of wing 401 can be made heavy enough to return wing 301 from any position to its rest (i.e., horizontal) position. The energy of the wind is translated, by use of wing 401, to an elevation force that is added to the force generated by the energy of the waves, which is obtained by use of wing 301. The combined force, i.e. the sum of the wind force and wave force, displaces wing 301 more efficiently. The result of this is a larger electrical energy at the output of the converter.

In FIG. 3, reference numeral 300 denotes a buoy that floats on the surface of the sea to support sleeve 304 and wing 301. Wing 301 is shown comprising a plurality of wing cells, such as wing cells 312, which form a honeycomb-like structure. Reference numeral 314 denotes a pivotable sleeve, which is rigidly connected to (wave) wing 301 and contains electricity generation means that generate electricity as a function of the displacement of wing 301, relative to the horizon, which is caused by the motion of waves. Each wing cell 312 has a wide opening 305 that is directed to a direction substantially perpendicular to the plane of the wing, such that, whenever wing 301 is in its rest, i.e. normal or horizontal, position, the wide openings of the wing cells face the water side and are fully immersed in the body of water. Each wing cell includes also a narrower, elongate, passage (a 'vent' opening, 304), that connects the interior 310 of the wing cell to the atmosphere (306) in the opposite side of the wing. Therefore, whenever wing 301 is in horizontal position, the water 'pushes' the air locked in the interior 310 of the wing cells through the respective vent opening 304, whereby to allow to the interior 310 of each wing cell to be filled with water. Only four wing cells are shown in FIG. 3 (312), for simplicity. The honeycomb-like wing cells are arranged such that the closer the cells to the sleeve 314, the larger is their interior space, and therefore, the larger their water-holding capacity.

The energy converter of the present invention can be incorporated into the energy converter shown in FIG. 4 by installing the HAC 101 on the upper side 401 of the "wind wing" (401), i.e., the side normally facing the sun thereby using the energy of the sun to heat the interior of the HAC. The HDC 102 is installed on the lower side of the "wind wing" (401), thereby utilizing the spray of the water, which surges upwards, essentially vertically, through the 'vent' openings 304 in the honeycomb-like wave wing, to cool the HDC 102 and, the ferrofluid, ferromixture and/or ferrogas contained within it.

A theoretical analysis using the first and the second laws of thermodynamics and based a converter having the proposed design shown in FIG. 2 and operated at first temperature (T1) of about 27° C., second temperature (T2) of about 20° C., and with the pressure in the system about 0.5 atmospheres, shows that the efficiency of the converter is about 17%. Taking into account the possibility of concentrating the sun's radiation at the locations shown by use of suitable optical arrangements, the theoretical efficiency of the converter was calculated to be significantly higher. As a general guideline, the higher the temperature at which the ferrofluid can be kept in its fluid state, the higher the maximum allowable temperature at which the system can operate, which leads to even further improvement in the efficiency of the converter.

The above embodiments have been described by way of illustration only and it will be understood that the invention may be carried out with many variations, modifications and adaptations, without departing from its spirit or exceeding the scope of the claims.

The invention claimed is:

1. A converter for converting thermal energy into electrical energy by causing magnetic particles to circulate in said converter to induce electric current in one or more coils of electric wires, said converter comprising:
   a) A main circuit, comprising:
      a.1) A Heat Absorbing Container (HAC), having an inlet, connected to the first end of an inlet conduit, and a first outlet, connected to a first end of an outlet conduit; wherein said inlet conduit, said outlet conduit, and said HAC initially contain ferrofluid and carrier gas and said HAC is designed to absorb heat energy from an external heat source to heat said ferrofluid and said carrier gas to a first temperature (T1), at a first pressure (P1);
      a.2) An elongate Heat Dissipating Container (HDC) initially filled with ferrofluid and carrier gas, having an inlet, connected to the second end of said outlet conduit, and an outlet connected to the second end of said inlet conduit; wherein said HDC is designed to dissipate heat to an external heat sink, thereby cooling said ferrofluid and said carrier gas contained therein to a second temperature (T2), lower than T1, at a second pressure (P2);
   b) A reservoir container, connected by a conduit to the outlet of said HDC; said reservoir container designed to further cool the ferrofluid at the outlet of said HDC and to regulate the operating conditions in said converter such that the relationship between T1 and P1 remains within the desired range inside said HAC and said ferrofluid exits said HAC as ferrogas while passing from said HAC to said outlet conduit and such that the relationship between T2 and P2 assures full condensation of the ferrogas to ferrofluid at the outlet of said HDC; said regulation accomplished by allowing exchange of ferrofluid stored in said reservoir container with said main circuit such as to lower, or to raise, as required, the overall pressure in said main circuit;
   c) valves, for timely opening and closing said first outlet of said HAC and said outlet of said HDC and the inlet/outlet of said reservoir container;
   d) a first one-way valve, connected at said inlet of said HAC for allowing ferrofluid to flow only in a direction from said outlet of said HDC to the inlet of said HAC, as a result of the difference in pressure in said HAC and in said HDC;
   e) a second one-way valve, connected at said inlet of said HDC for allowing ferrogas to flow only in a direction from said first outlet of said HAC to the inlet of said HDC, as a result of the difference in pressure in said HAC and in said HDC;
   f) control means, for timely operating said valves;
   g) magnetic field generation elements, for generating magnetic fields around selected sections of said inlet conduit and said outlet conduit; said magnetic fields having direction and sufficient strength such that the individual magnetic fields of essentially all of said magnetic particles will be aligned by said generated fields when said particles move through said selected sections of said conduits; and
   h) electricity conducting wires, coiled around said selected sections of said inlet conduit and said outlet conduit, wherein electric current is induced in the coils of said wires by said aligned magnetic fields of said magnetic particles moving through said coils of said wires.

2. A converter according to claim 1, wherein the cross-sectional area of the HAC is larger than the cross-sectional areas of the outlet conduit, the inlet conduit, and the HDC.

3. A converter according to claim 1, wherein the reservoir container has separate inlet and outlet valves.

4. A converter according to claim 1, wherein part of the inlet conduit has been routed such that it is connected to the outlet conduit above and below the selected section wherein said selected section is a common portion of both said inlet conduit and said outlet conduit around which electricity conducting wires are coiled.

5. A converter according to claim 1, further comprising:
   a) a booster container comprising a booster inlet connected to a second outlet of the HAC and a booster outlet;
   b) a booster conduit whose first end is connected to said booster outlet and whose second end is connected, through a one-way valve that opens as a result of the pressure exerted thereon by the ferromixture in said booster conduit, to the midsection of said HDC;
   c) valves located at said second outlet of the HAC and said booster outlet, the activation of each of which is controlled by the controller;
   d) Magnetic field generation elements, for generating magnetic fields around selected sections of said booster conduit; said magnetic fields having sufficient strength and being orientated such that the individual magnetic fields of essentially all of said magnetic particles will be aligned when said particles move through said selected sections of said booster conduit; and
   e) Electricity conducting wires, coiled around said selected sections of said booster conduit, wherein electric current is induced in the coils of said wires by said aligned magnetic fields of said magnetic particles moving through said coils of said wires.

6. A converter according to claim 5, wherein part of the inlet conduit and part of the outlet conduit have been routed such that they are connected to the booster conduit above and below the selected section wherein said selected section is a common portion of said inlet conduit, said outlet conduit, and said booster conduit about which electricity conducting wires are coiled.

7. A converter according to claim 1, further comprising a by-pass conduit, the first end of which is connected to the HAC through a valve and the second end of which is connected directly to the HDC; wherein the purpose of said by-pass is to allow control of the velocity of flow of the circulating ferrofluid/ferrogas/ferromixture in the main circuit of said converter; said control including maintaining said velocity within a desired operating range, reducing said velocity, or completely stopping the circulation.

8. A converter according to claim 7, wherein the first end of the by-pass conduit is preferably located closer to the outlet of the HAC than to its inlet, and the second end of said by-pass conduit is preferably located closer to the outlet of the HDC than to its inlet.

9. A converter according to claim 5, in which the HAC is divided into two longitudinal sections, an inlet section connected to an outlet section through a one-way valve or filter, and the HDC is divided into two sections, an inlet section connected to an outlet section through a one-way valve; wherein, when the pressure in the respective inlet section exceeds the pressure in the respective outlet section, the respective valve opens allowing ferrofluid/ferrogas/ferromixture to flow from said respective inlet section to said respective outlet section.

10. A converter according to claim 5, provided with one or more optical arrangements located near one or more of the valves and/or in one or more of the conduits; said optical arrangement for collecting light rays and for focusing the collected light rays such as to raise the temperature of the ferromixture at the location of said optical arrangement, thereby increasing the velocity of the magnetic particles that are suspended in said ferromixture.

11. A converter according to claim 10, in which the optical arrangement comprises a window that is formed in the walls of the conduit.

12. A converter according to claim 11, in which the window comprises an activated shutter, which is opened and closed by the control system either in synchronization with the operation of the valves or according to conditions in the vicinity of said window.

13. A converter according to claim 10, in which the optical arrangement comprises a heliostat.

14. A converter according to claim 1, wherein the HAC is positioned on the top side of the wind wing of a sea wave energy converter and the HDC is installed on the bottom side of said wind wing.

15. A method for converting thermal energy into electrical energy in a converter whose main circuit is initially filled with ferrofluid and carrier gas; said main circuit comprising:
  a) a Heat Absorbing Container (HAC), designed and located such that it is capable of absorbing heat from an external heat source, said HAC having an inlet, connected to the first end of an inlet conduit, and a first outlet, connected to a first end of an outlet conduit;
  b) an elongate Heat Dissipating Container (HDC), designed and located such that it is capable of dissipating heat to an external heat sink, said HDC having an inlet, connected to the second end of said outlet conduit, and an outlet connected to the second end of said inlet conduit;
  c) valves;
  d) Control means, for timely operating said valves;
  e) magnetic field generation elements, for generating magnetic fields around selected sections of the inlet conduit and the outlet conduit; said magnetic fields having sufficient strength and being orientated such that the individual magnetic fields of essentially all of the magnetic particles will be aligned by said generated fields when said particles move through said selected sections of said conduits; and
  f) electricity conducting wires, coiled around selected sections of said conduits;
  wherein, by controlling the local temperature and pressure at different locations in said main circuit, magnetic particles initially suspended in said ferrofluid will be made to circulate in a closed-loop in said main circuit, thereby inducing an electric current in the coils of said wires when the aligned magnetic fields of said magnetic particles move through said coils of said wires.

16. A method according to claim 15, wherein the electricity is generated by the following steps:
  a) allow heat to be absorbed by the HAC, from an external heat source, thereby to increasing the temperature of the ferrofluid and carrier gas and the pressure inside said HAC;
  b) open valves at the first and second ends of the outlet conduit, thereby allowing the high pressure carrier gas to push ferrofluid out of said HAC, said ferrofluid changing phase to ferrogas and releasing the suspended magnetic particles, which are carried through said outlet conduit towards said HDC by the ferromixture and carrier gas;
  c) utilize the high pressure in said HAC and said outlet conduit to force ferromixture, into the HDC, thereby raising the pressure of the gas in said HDC;
  d) cooling said ferromixture in said HDC, thereby condensing the ferrogas in said ferromixture to ferrofluid;
  e) close said valves at said first and second ends of said outlet conduit and open valves at the first and second ends of the inlet conduit, when the difference in pressure in said HDC and in said HAC reaches a predetermined value, thereby allowing ferrofluid and carrier gas to be pushed from said HDC to said HAC through said inlet conduit;
  f) commencing the next cycle of operation, by repeating steps a) to e); and
  g) in each cycle, aligning the magnetic fields of said magnetic particles as they pass through selected sections of said inlet and said outlet conduits, around which selected sections electricity conducting wires are coiled;
  thereby inducing electric currents in said coils of electricity conducting wires.

17. A method according to claim 15, wherein the converter additionally comprises one or more of the following:
  a) a reservoir container, connected by a conduit to the outlet of the HDC;
  b) a booster container comprising a booster inlet connected to a second outlet of the HAC and a booster outlet connected to the first end a booster conduit whose second end is connected, through a one-way valve to the midsection of said HDC;
  c) a by-pass conduit, the first end of which is connected to said HAC through a valve and the second end of which is connected directly to said HDC, said by-pass allowing control of the velocity of flow of the circulating ferrofluid/ferrogas/ferromixture in the main circuit of said converter;
  d) an HAC which is divided into two longitudinal sections, an inlet section connected to an outlet section through a one-way valve or one-way filter;
  e) an HDC which is divided into two sections, an inlet section connected to an outlet section through a one-way valve; and
  f) one or more optical arrangements located near one or more of said valves or near one or more of the areas where electricity is produced.

18. A method according to claim 17, wherein the electricity is generated by the following steps:
  a) allow heat to be absorbed by the HAC, from an external heat source, thereby to increasing the temperature of the ferrofluid and carrier gas and the pressure inside said HAC;
  b) open valves at the first and second ends of the outlet conduit, thereby allowing the high pressure carrier gas to push ferrofluid out of said HAC, said ferrofluid changing phase to ferrogas and releasing the suspended magnetic particles, which are carried through said outlet conduit towards said HDC by the ferromixture and carrier gas;

c) utilize the high pressure in said HAC and said outlet conduit to force ferromixture, into the HDC, thereby raising the pressure of the gas in said HDC;

d) cooling said ferromixture in said HDC, thereby condensing the ferrogas in said ferromixture to ferrofluid;

e) close said valves at said first and second ends of said outlet conduit and open valves at the first and second ends of the inlet conduit, when the difference in pressure in said HDC and in said HAC reaches a predetermined value, thereby allowing ferrofluid and carrier gas to be pushed from said HDC to said HAC through said inlet conduit;

f) commencing the next cycle of operation, by repeating steps a) to e); and g) in each cycle, aligning the magnetic fields of said magnetic particles as they pass through selected sections of said inlet and said outlet conduits, around which selected sections electricity conducting wires are coiled;

thereby inducing electric currents in said coils of electricity conducting wires.

19. A method according to claim 18, wherein the converter comprises a booster container comprising a booster inlet connected through a valve to a second outlet of the HAC and a booster outlet connected through a valve to the first end of a booster conduit whose second end is connected, through a one-way valve to the midsection of the HDC, said method comprising the additional steps of:

h) opening said valve at said booster outlet at step b);

i) open said valve at said first end of said booster conduit when the pressure difference between the gas in said booster container and said HDC reaches a predetermined value;

j) close said valve at said booster outlet at step e); and k) close said valve at said first end of said booster conduit when the pressure difference between the gas in said booster container and said HDC reaches a predetermined value.

20. A method according to claim 18, wherein the converter comprises a by-pass conduit, the first end of which is connected to the HAC through a valve and the second end of which is connected directly to the HDC, said method comprising the additional step of opening said valve at the first end of said by-pass conduit when necessary, thereby reducing the difference in the pressures inside said HAC and said HDC thus changing the velocity of flow of the circulating ferrofluid/ferrogas/ferromixture in the main circuit of said converter.

21. A method according to claim 18, wherein the converter comprises one or more optical arrangements located near one or more of the valves, said optical arrangements comprising shutters, said method comprising the additional step of opening said shutter at an appropriate time to increase the localized temperature of the ferrofluid/ferrogas/ferromixture in the focal zone of said optical arrangement.

* * * * *